Patented June 20, 1933

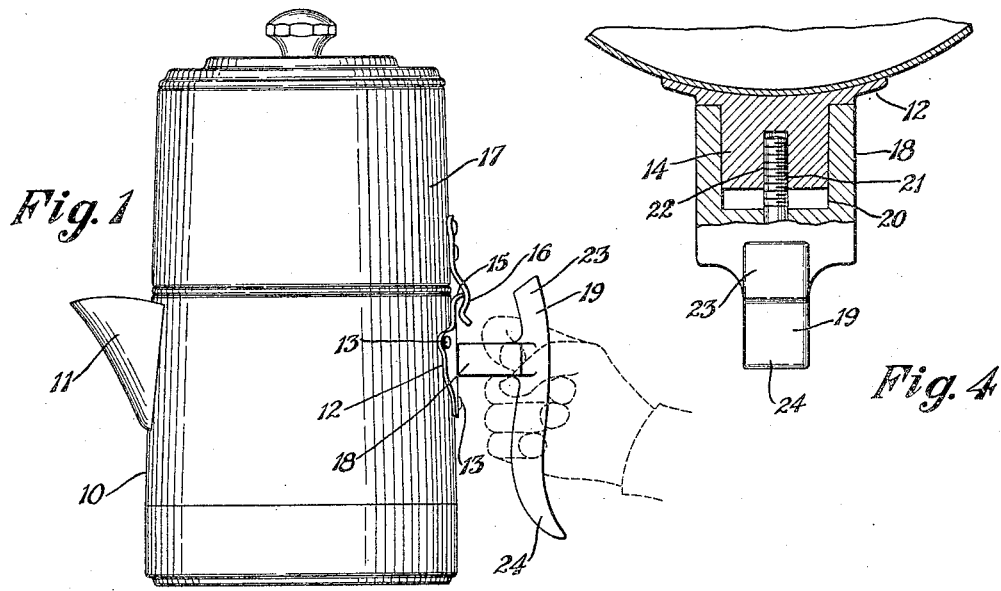
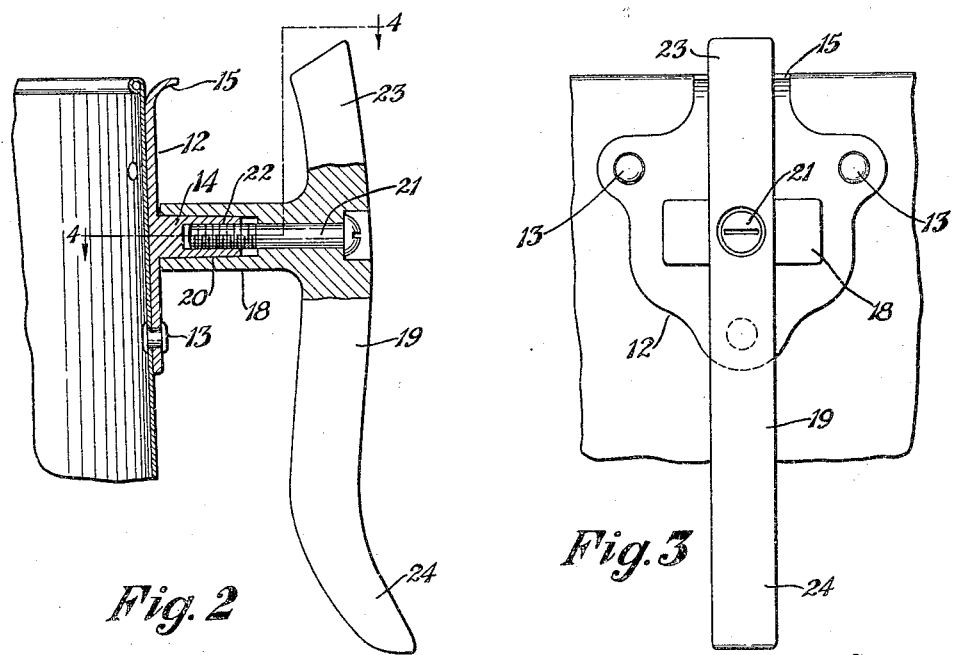

1,915,130

UNITED STATES PATENT OFFICE

RICHARD F. KRAUSE, OF MASSILLON, OHIO

HANDLE FOR COFFEEPOTS AND THE LIKE

Application filed May 3, 1932. Serial No. 608,975.

The invention relates to handles for coffeepots and the like and more particularly to a handle and bracket therefor which is an improvement over my copending application Serial No. 600,142, filed March 21, 1932.

The object of the improvement is to provide a one-piece handle with a single point of connection to the utensil and an improved bracket for connecting the handle to the utensil so arranged that only a single screw is necessary to attach the handle to the bracket.

The above and other objects may be attained by constructing the improved handle and bracket in the manner illustrated in the accompanying drawing, in which Figure 1 is a side elevation of a coffeepot provided with the improved handle and bracket;

Fig. 2, an enlarged sectional elevation of the handle and bracket;

Fig. 3, a rear elevation of the same; and

Fig. 4, a sectional elevation as on the line 4—4, Fig. 2.

Similar numerals refer to similar parts throughout the drawing.

The improved handle and bracket are shown, for the purpose of illustration, as applied to a coffeepot of the drip coffee type, although it should be understood that the same form of handle and bracket is adapted for use upon other forms of coffeepots, percolators, teapots and other utensils.

The coffeepot is indicated generally at 10, being provided at one side with the usual spout 11, the improved handle and bracket to which the invention pertains being preferably connected to the coffeepot at a point diametrically opposite to the spout.

The bracket is indicated generally at 12 and may be fixed to the utensil as by the rivets 13, and has formed integrally therewith a substantially horizontally disposed flat boss 14 which is preferably slightly tapered toward its outer end.

The upper end of the bracket 12 is preferably bent outward as at 15 to form a projection arranged to be engaged by the usual spring clip 16 carried by the upper vessel 17 of the drip coffeepot.

The handle is provided with the substantially wide, flat, horizontal base portion 18 connected to the hand grip portion 19 at a point near the upper end thereof and at substantially right angles thereto, as best shown in Figs. 1 and 2.

The inner end of the base portion 18 is provided with a flat socket 20 preferably slightly tapered to correspond to the shape of the boss 14 which is received in said socket, as shown in Figs. 2 and 4. A single screw, as indicated at 21, may be located through a suitable opening in the handle and received in the tapped opening 22 in the boss 14 for rigidly securing the handle upon the bracket.

The upper or shorter end of the hand grip is preferably curved slightly inward toward the pot as at 23, while the lower or longer end thereof is preferably curved outward or away from the pot at its lower end as at 24. The base and hand grip of the handle are preferably formed in one piece as illustrated, the entire handle being desirably molded of some material such as Bakelite or the like.

The hand grip portion of the handle is considerably narrower than the base portion thereof and is centrally located thereon as best shown in Figs. 3 and 4, so that the hand grip portion of the handle may be easily gripped in the hand as shown in broken lines in Fig. 1, the base portion 18 being preferably received between the index and middle fingers of the hand, as shown in said figure.

By thus gripping the substantially wide flat base portion of the handle between the fingers, the utensil is steadied against accidental turning movement in the hand, while at the same time the utensil may be easily and readily turned to any desired position by movement of the hand.

I claim:

1. In a handle for a coffeepot and the like, a bracket attached to the side wall of the coffeepot and having a substantially perpendicular, flat boss thereon, and a handle including a normally horizontal, relatively wide, flat base portion provided with a socket shaped to receive said boss, and a normally vertical hand grip portion of considerably less width than the wide, flat base portion and attached intermediate its ends to the base portion.

2. In a handle for a coffeepot and the like, a bracket attached to the side wall of the coffeepot and having a substantially perpendicular, flat boss thereon, and a handle including a normally horizontal, relatively wide, flat base portion provided with a socket shaped to receive said boss, a normally vertical hand grip portion of considerably less width than the wide, flat base portion and attached intermediate its ends to the base portion, and a screw located through the handle and boss.

In testimony that I claim the above, I have hereunto subscribed my name.

RICHARD F. KRAUSE.